Dec. 1, 1959 S. W. MARTIN 2,914,895

ENVELOPE STUFFING MACHINE

Filed Feb. 13, 1959 14 Sheets-Sheet 1

INVENTOR
Samuel W. Martin
BY
Edwin H. Owen
ATTORNEY

Dec. 1, 1959 S. W. MARTIN 2,914,895

ENVELOPE STUFFING MACHINE

Filed Feb. 13, 1959 14 Sheets-Sheet 2

INVENTOR
Samuel W. Martin
BY
Edwin K. Owen
ATTORNEY

Dec. 1, 1959 S. W. MARTIN 2,914,895

ENVELOPE STUFFING MACHINE

Filed Feb. 13, 1959 14 Sheets-Sheet 3

INVENTOR
Samuel W. Martin
BY
Edwin H. Oliver
ATTORNEY

Dec. 1, 1959 S. W. MARTIN 2,914,895
ENVELOPE STUFFING MACHINE
Filed Feb. 13, 1959 14 Sheets-Sheet 4

INVENTOR
Samuel W. Martin
BY
Edwin H. Owen
ATTORNEY

Dec. 1, 1959 S. W. MARTIN 2,914,895

ENVELOPE STUFFING MACHINE

Filed Feb. 13, 1959 14 Sheets-Sheet 5

INVENTOR
Samuel W. Martin
BY
Edwin H. Owen
ATTORNEY

Dec. 1, 1959 S. W. MARTIN 2,914,895

ENVELOPE STUFFING MACHINE

Filed Feb. 13, 1959 14 Sheets-Sheet 6

INVENTOR.
Samuel W. Martin
BY
ATTORNEY

Dec. 1, 1959 S. W. MARTIN 2,914,895

ENVELOPE STUFFING MACHINE

Filed Feb. 13, 1959 14 Sheets-Sheet 7

INVENTOR.
Samuel W. Martin
BY
Edwin H. Owen
ATTORNEY

Dec. 1, 1959 S. W. MARTIN 2,914,895

ENVELOPE STUFFING MACHINE

Filed Feb. 13, 1959 14 Sheets-Sheet 8

INVENTOR
Samuel W. Martin
BY
Edwin H. Owen
ATTORNEY

INVENTOR
Samuel W. Martin
BY
Edwin H. Over
ATTORNEY

INVENTOR
Samuel W. Martin
BY
Edwin H. Owen
ATTORNEY

Dec. 1, 1959 S. W. MARTIN 2,914,895

ENVELOPE STUFFING MACHINE

Filed Feb. 13, 1959 14 Sheets-Sheet 11

INVENTOR
Samuel W. Martin
BY
Edwin H. Owen
ATTORNEY

Dec. 1, 1959 S. W. MARTIN 2,914,895

ENVELOPE STUFFING MACHINE

Filed Feb. 13, 1959 14 Sheets-Sheet 12

INVENTOR
Samuel W. Martin
BY
ATTORNEY

INVENTOR
Samuel W. Martin
BY
Edwin M. Oliver
ATTORNEY

INVENTOR
Samuel W. Martin
BY
Edwin H. Owen
ATTORNEY

United States Patent Office 2,914,895

Patented Dec. 1, 1959

2,914,895

ENVELOPE STUFFING MACHINE

Samuel W. Martin, Weston, Conn., assignor to Pitney-Bowes, Inc., Stamford, Conn., a corporation of Delaware Application February 13, 1959, Serial No. 793,060

17 Claims. (Cl. 53—59)

This invention relates to a machine for stuffing insertions in envelopes and more particularly to improvements over a device disclosed in United States Patent No. 2,771,726, granted November 27, 1956.

The stuffing machine generally comprises a base having a reciprocating ram therein which is adapted to move a folded or non-folded sheet into the mouth of an envelope positioned in the path thereof. The sheet is adapted to be either automatically fed from a sheet feeding unit directly to the stuffing machine when attached thereto, or automatically fed from the sheet feeding unit to a folding machine then to the stuffing machine. In each case the sheet moves to a pick-up position in front of the ram and is then advanced by the ram into the envelope and to an ejection position. Sheets are initially fed from the sheet feeding unit on demand upon signal from the stuffing machine and the several machine operations are controlled by various electrical devices.

One object of the invention is to provide a detachable sheet feed unit for the stuffing machine, said unit being adapted to automatically feed sheets on demand and to further provide for the attachment of the sheet feed unit to a folding machine when the latter is combined with the stuffing machine.

Another object is to provide electrically controlled elements for maintaining accurate cycling of the operations of the stuffing machine when combined directly with the piece feed unit. It is also an object to utilize electrically controlled elements to assure that an envelope stuffing and ejecting operation is completed before another cycle of operation begins.

Another object is to provide a plural number of envelope mouth opening claw elements at each side of a sheet advancing element which are adapted to enter said mouth in successive order with the outermost claws entering last and further providing stop members for limiting the movement of the claw elements.

A further feature is to provide an adjustably positioned sheet engaging or pusher member which projects below a ram plate portion of the reciprocating element, the same being adjustable to accommodate varying widths of sheets which are to be inserted in the envelopes and to thereby assure the complete insertion of the piece.

Figures 5, 6:
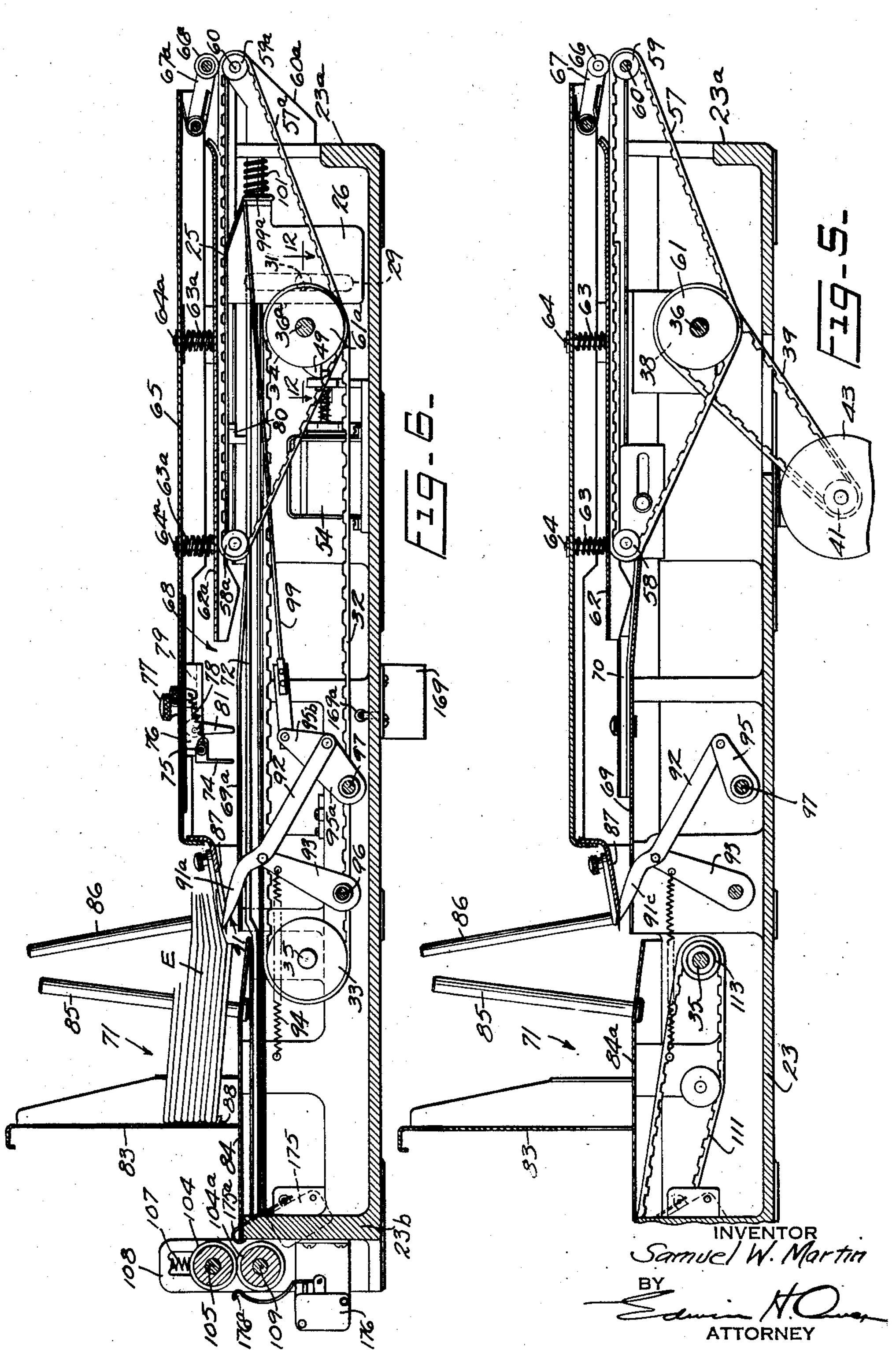
Fig. 5 is a longitudinal section taken along the line 5—5 of Fig. 8.
Fig. 6 is a longitudinal section taken along the line 6—6 of Fig. 8.
Figure 8:
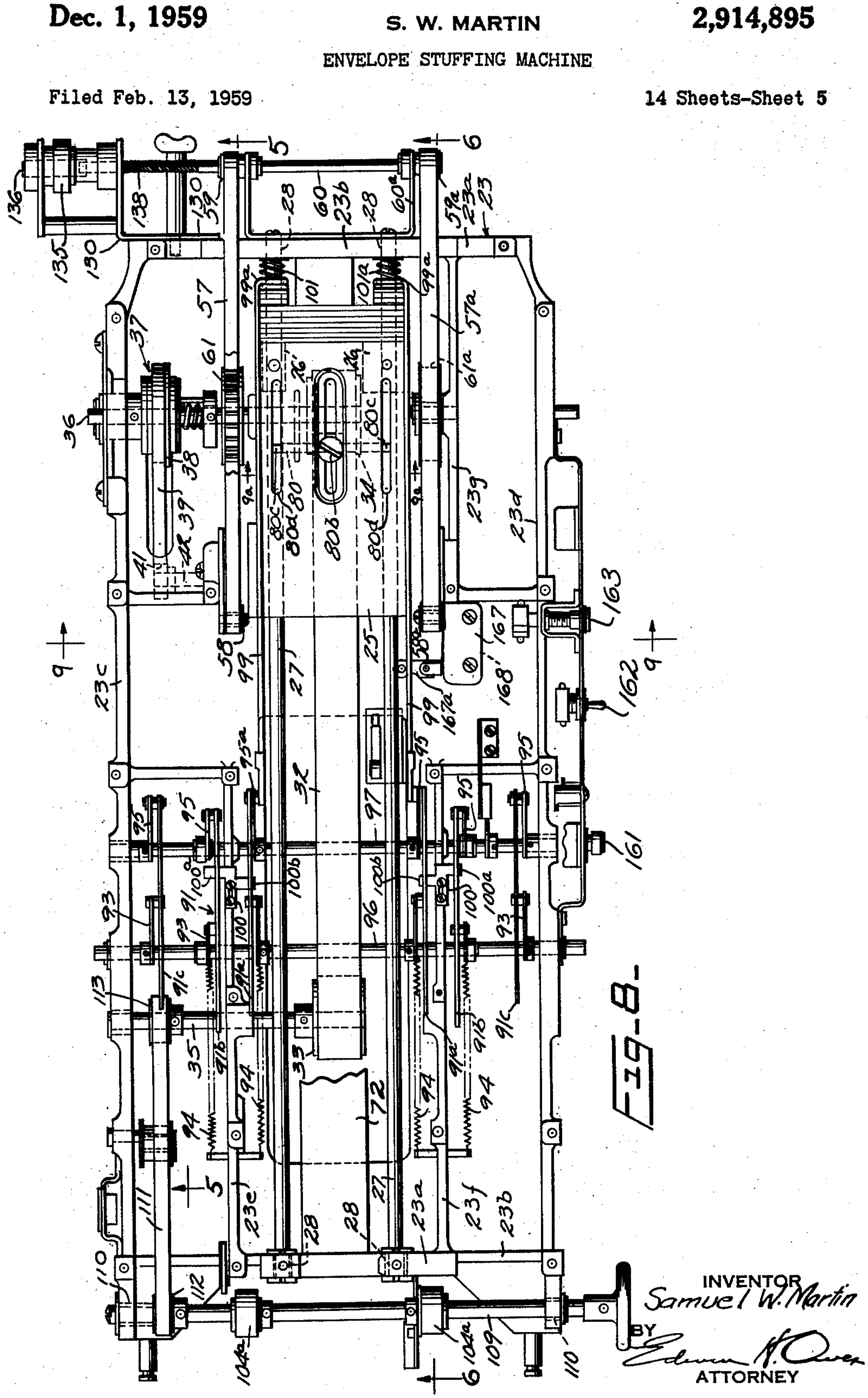
Fig. 8 is a plan view of the envelope stuffing machine with the upper deck plates and covers removed.
Figure 9:
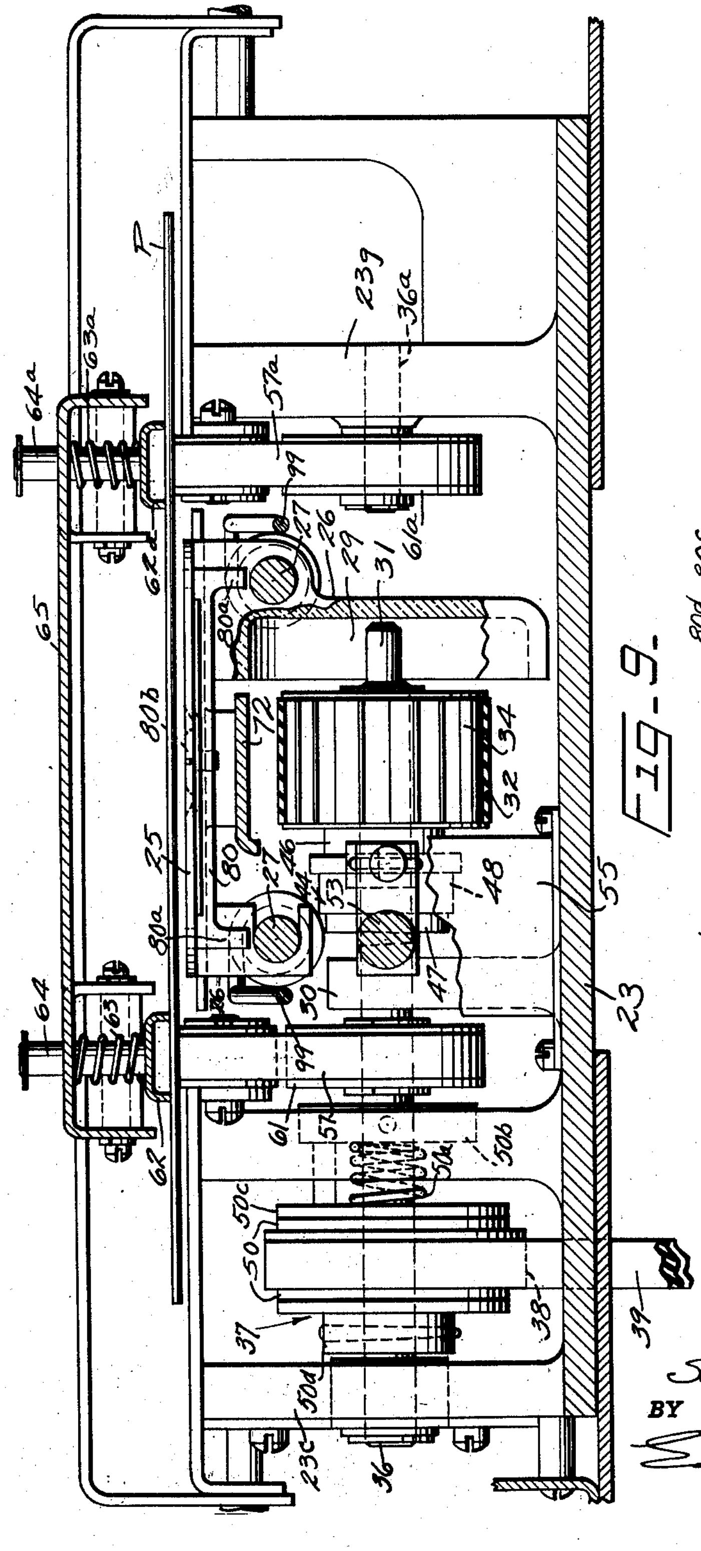
Fig. 9 is a cross sectional view through the envelope stuffing machine taken along the line 9—9 of Fig. 8.
Figure 9A:
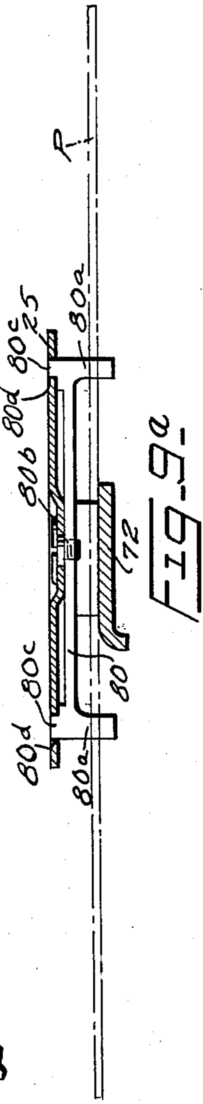
Figure 10:
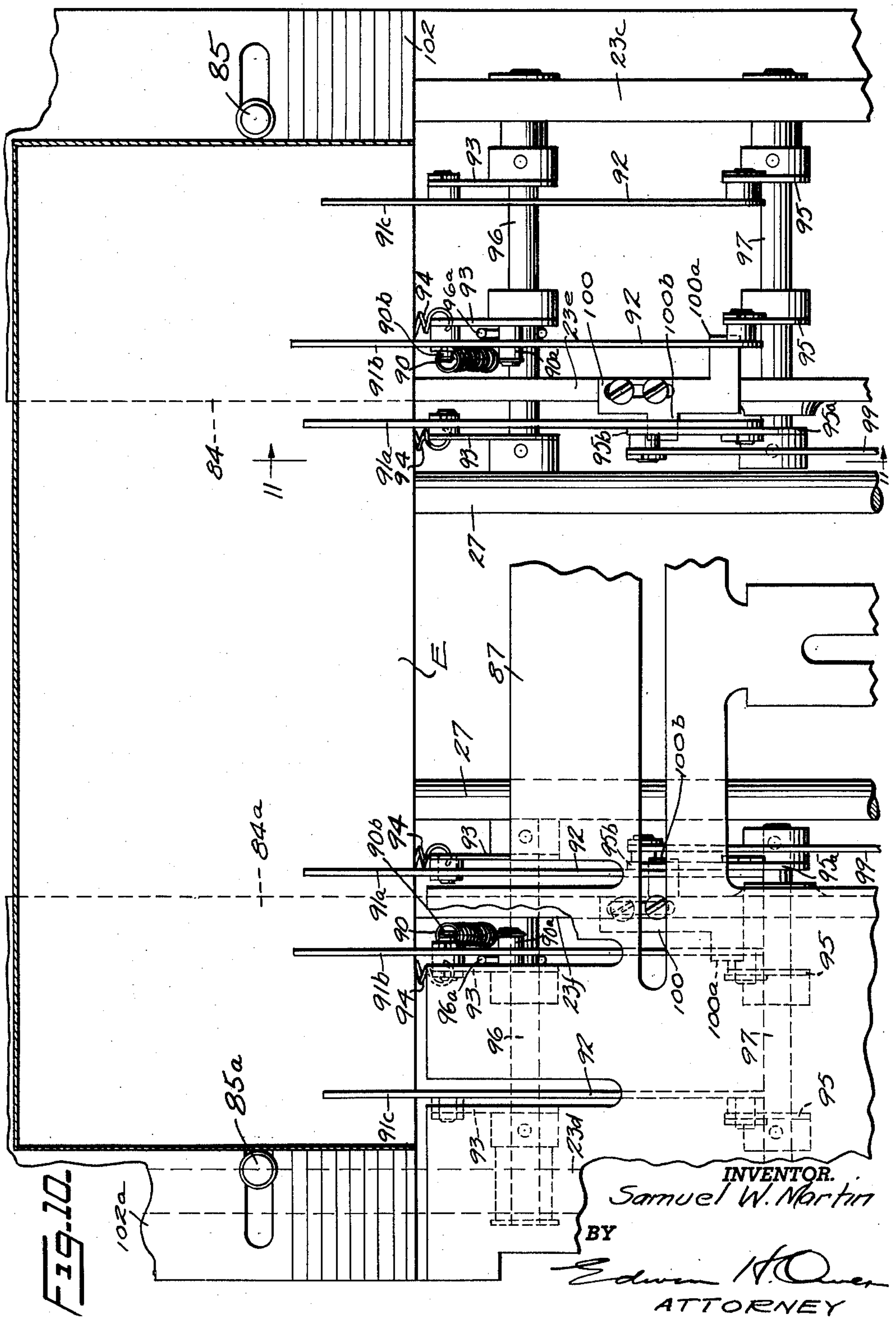
Figure 11:
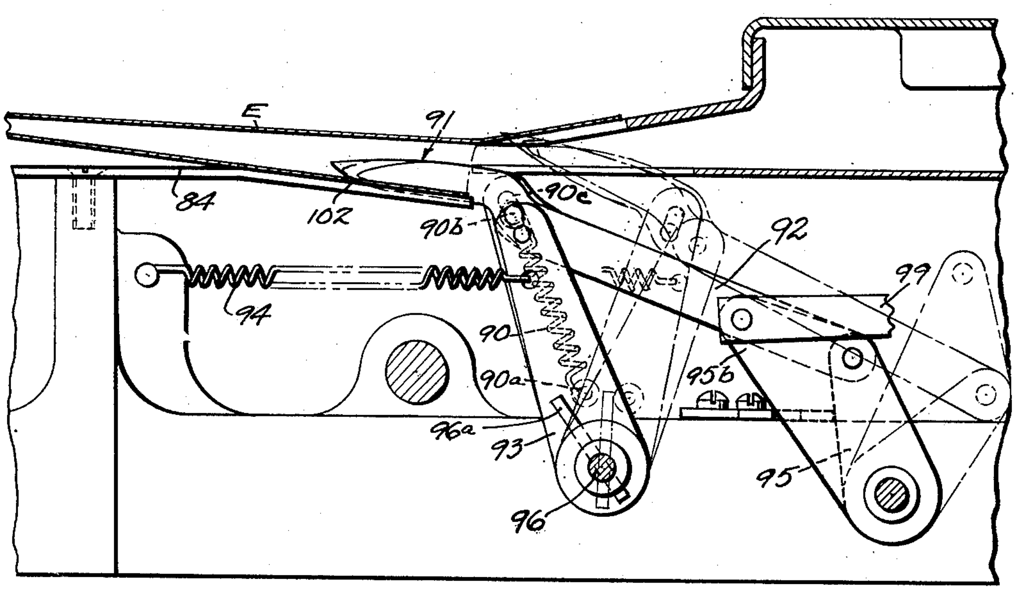
Figures 12, 13:
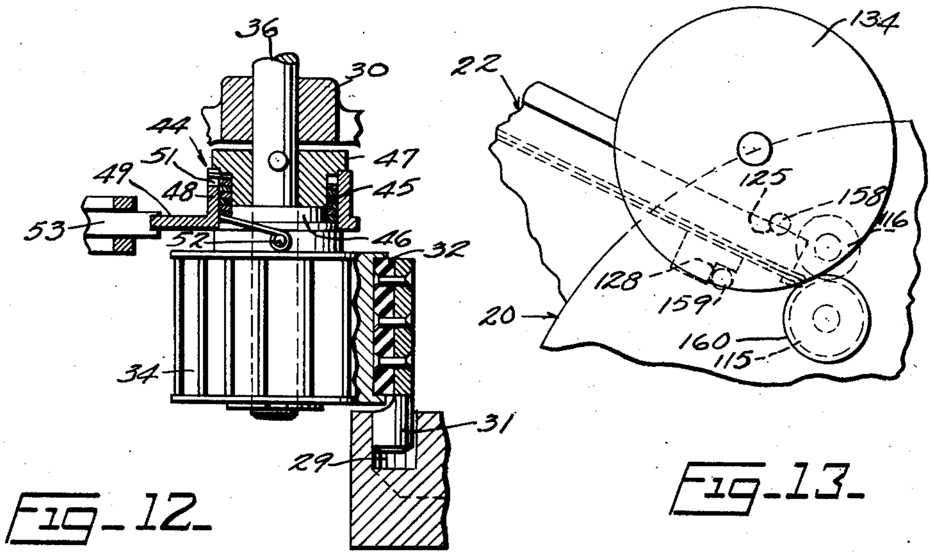
Figure 14:
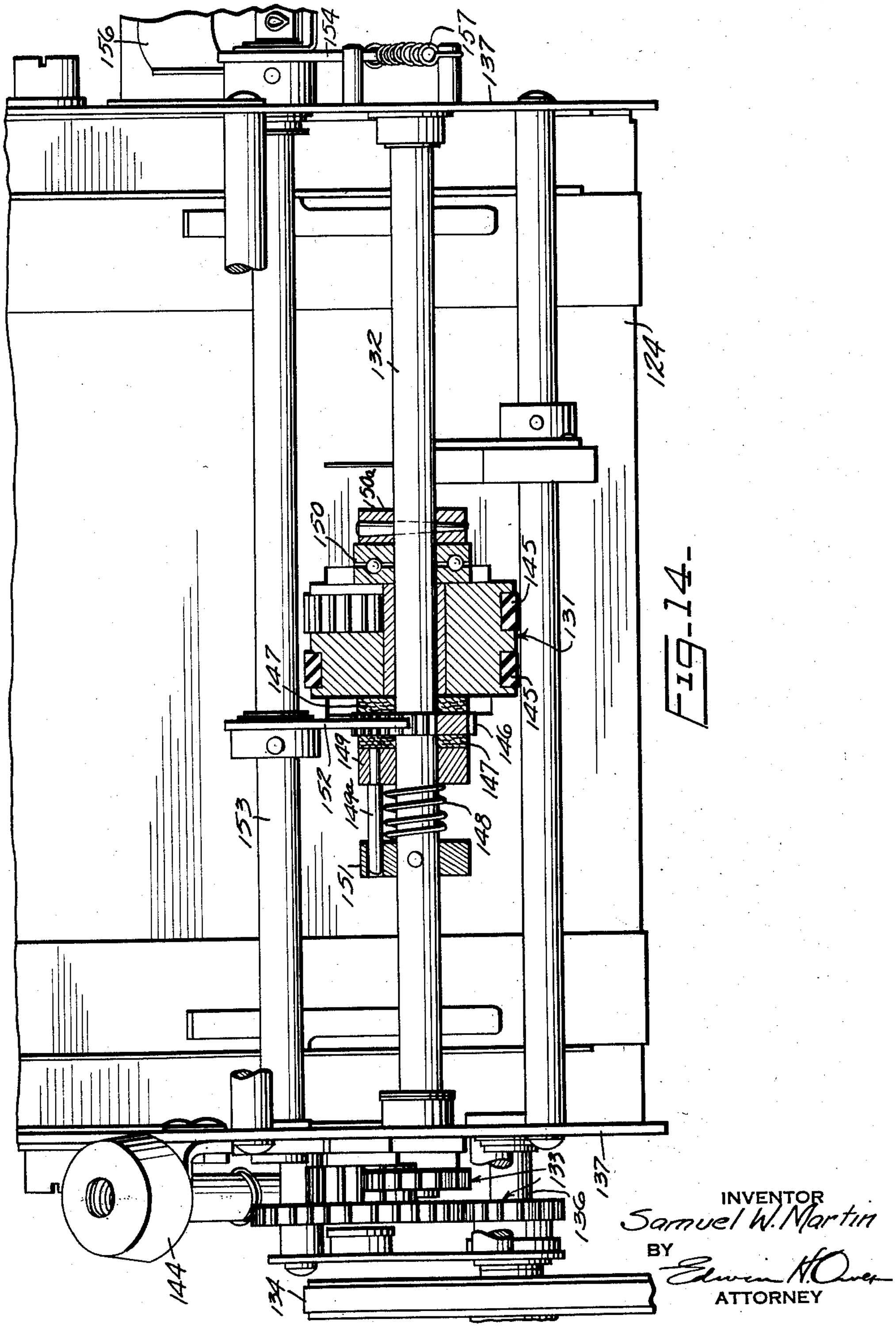
Figure 15:
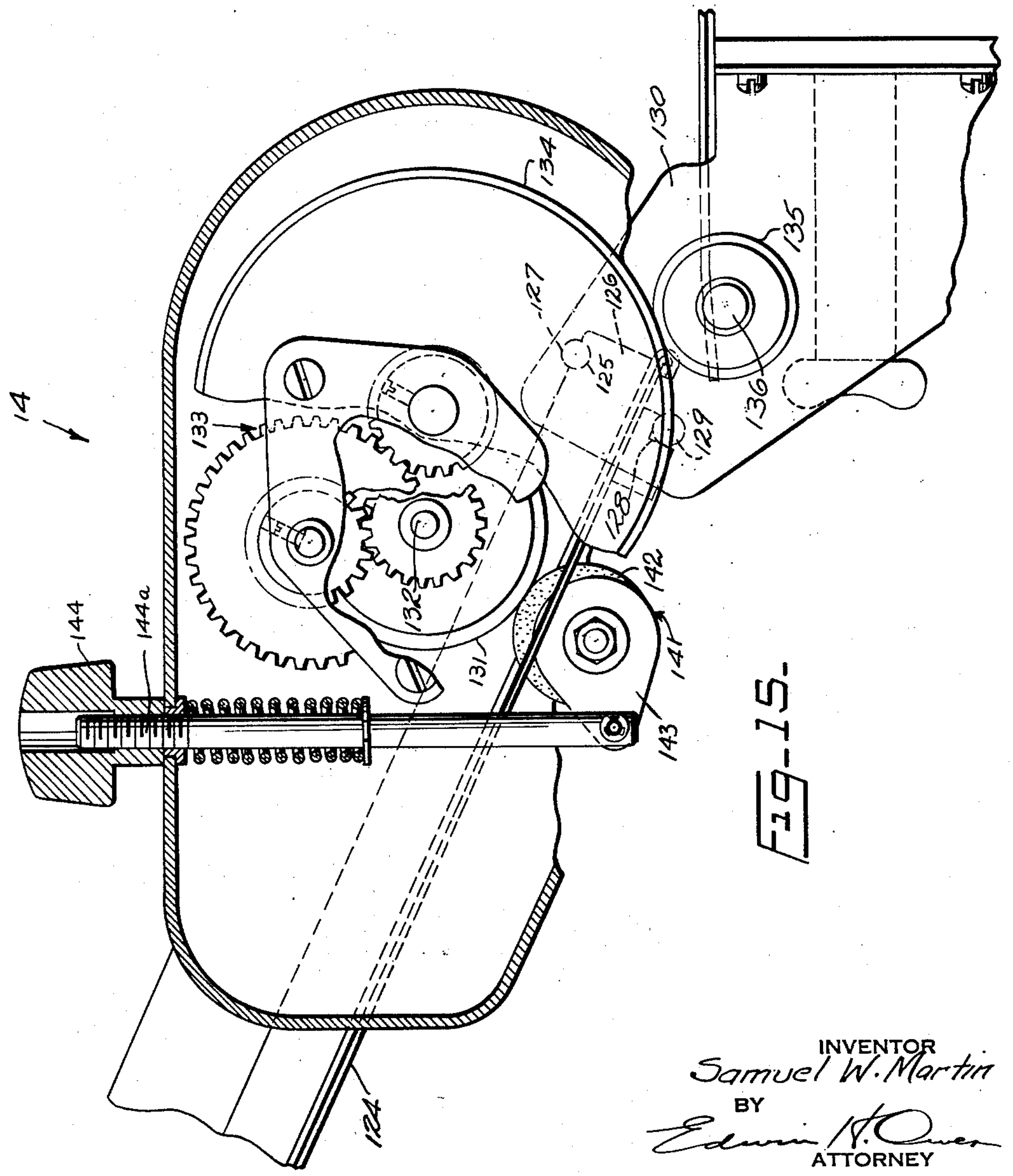
Figure 16:
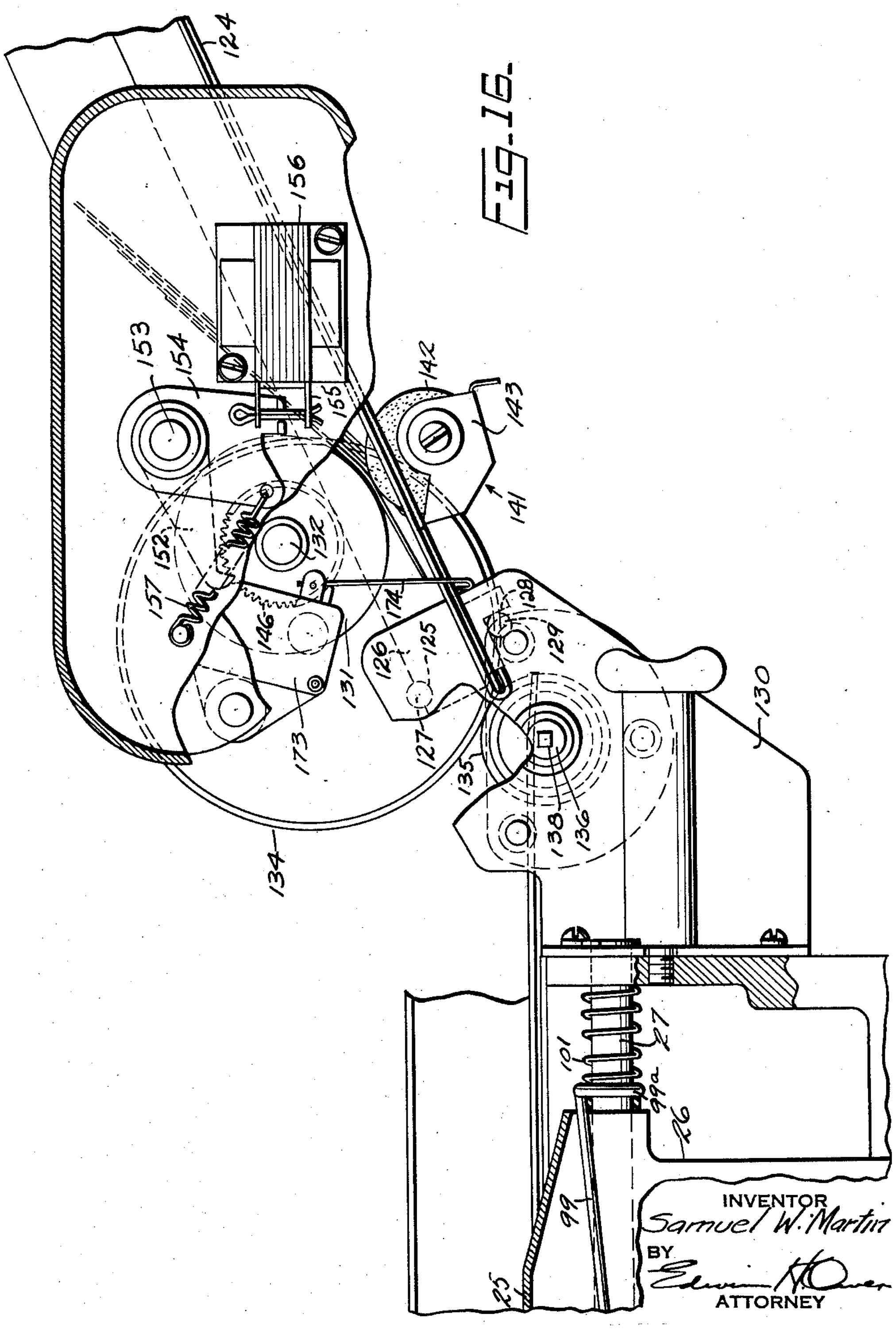
Figures 17, 18:
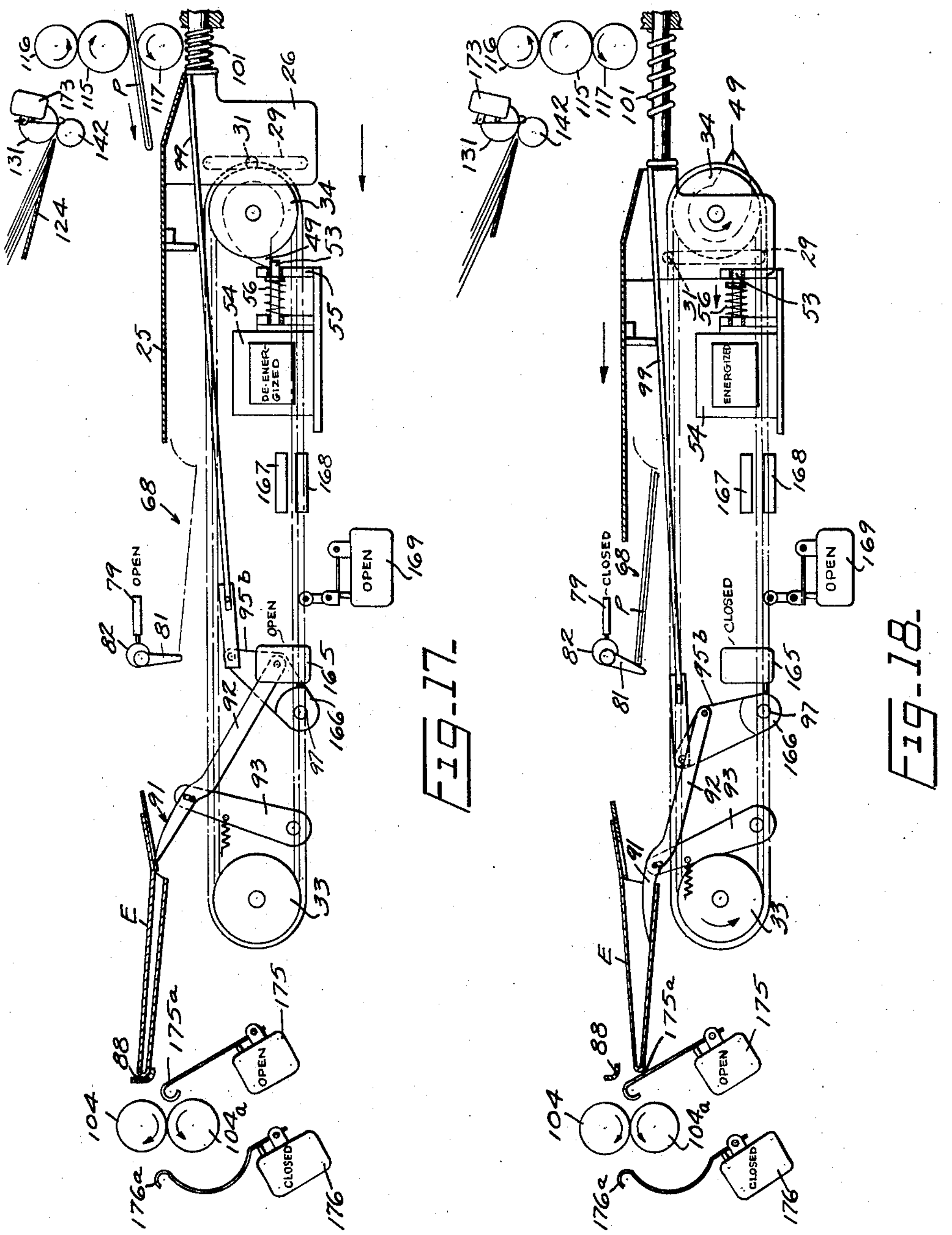
Figure 19:
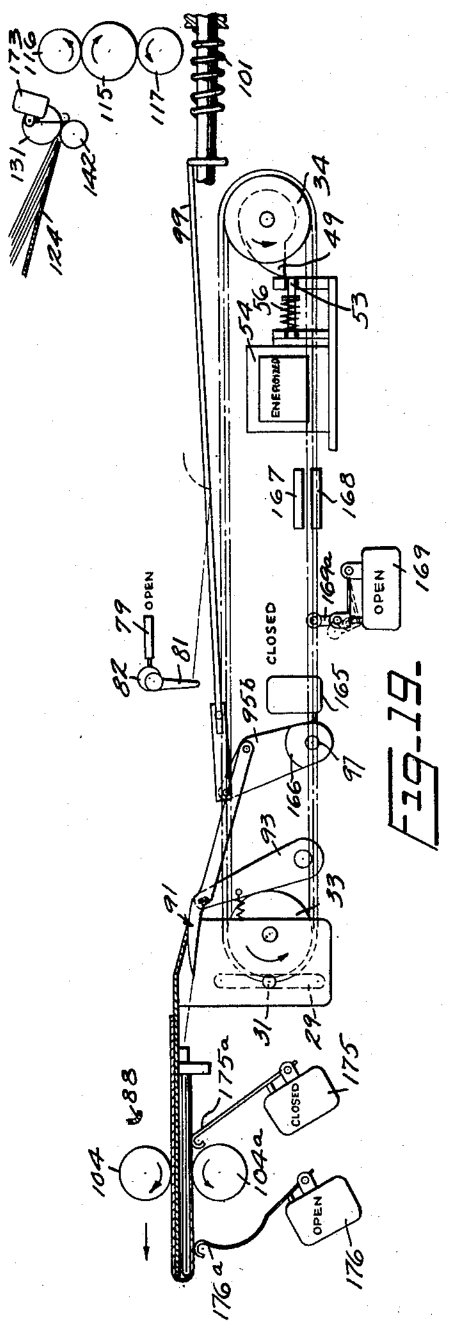
Figure 20:
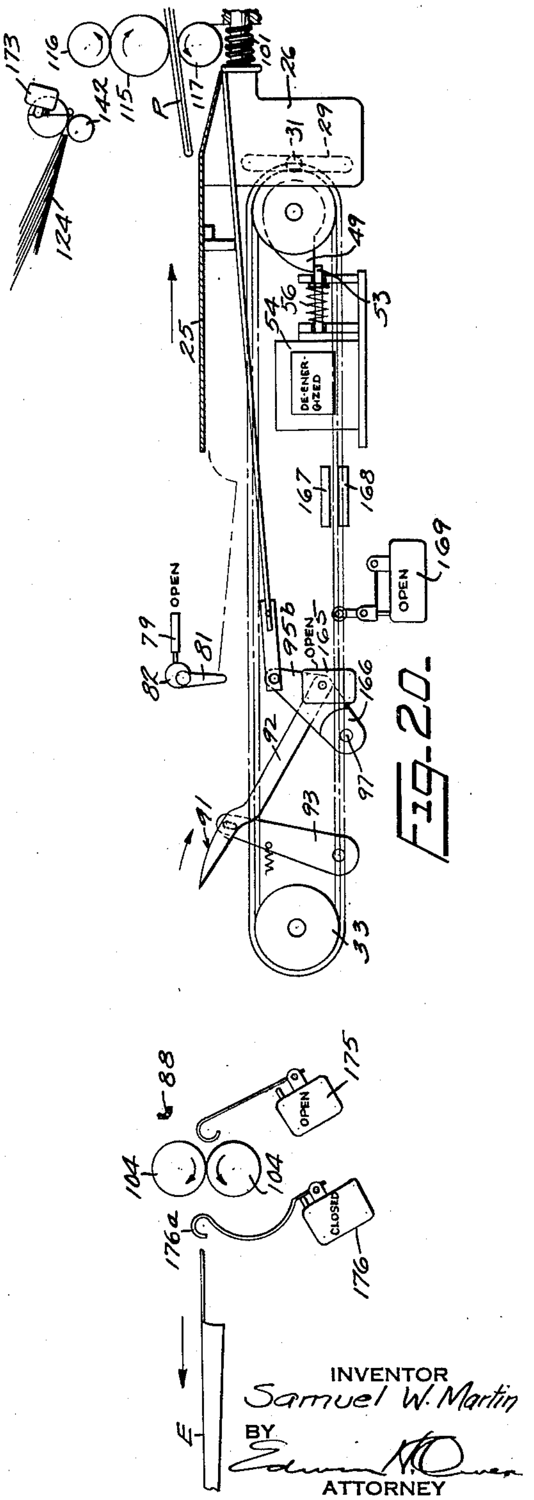
Figure 21:
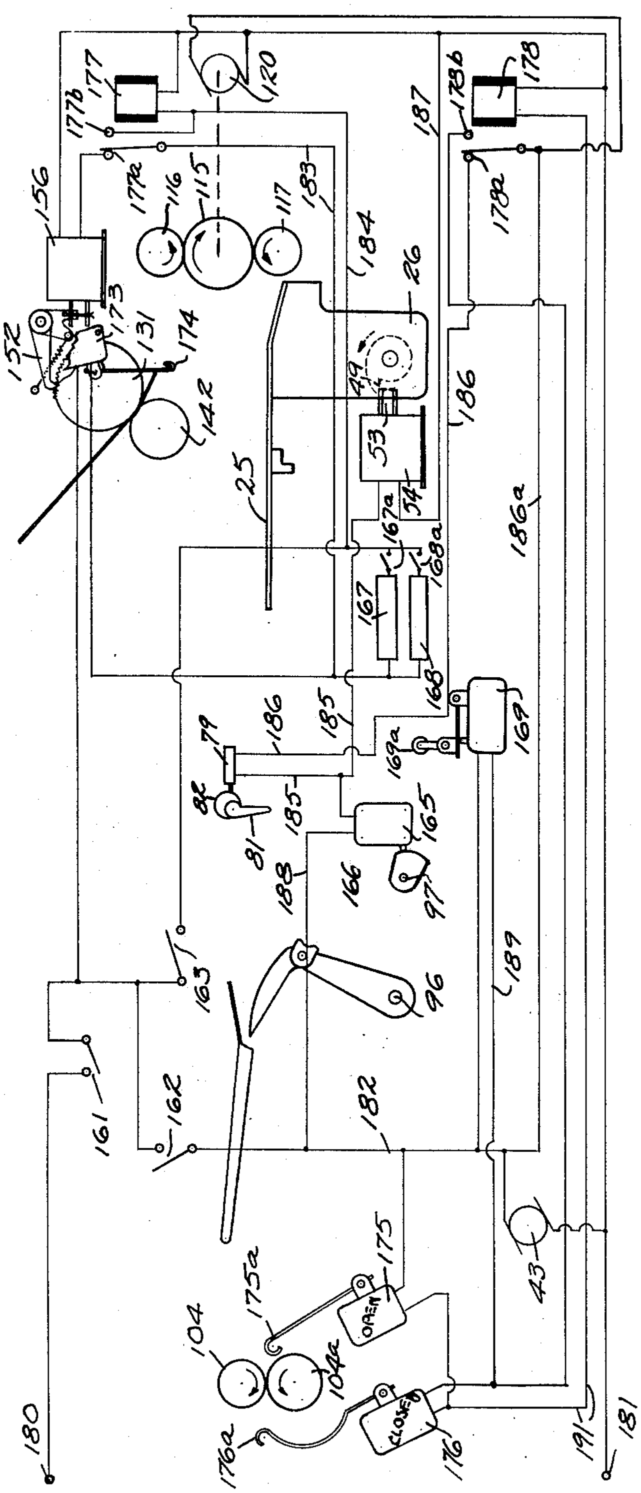

Fig. 9*a* is a cross sectional view taken along the line 9*a*—9*a* of Fig. 8;

Fig. 10 is an enlarged plan view with parts broken away showing the envelope mouth opening claw mechanism in a mouth opening position;

Fig. 11 is a sectional view taken substantially along the line 11—11 of Fig. 10;

Fig. 12 is a sectional view taken substantially along the line 12—12 of Fig. 6;

Fig. 13 is a detail elevational view showing the drive of the piece feeding mechanism when the feed plate is attached to the folding machine;

Fig. 14 is a plan view taken in the direction of the arrow 14 of Fig. 15 with the clutch mechanism shown in section;

Fig. 15 is a detail elevational view of the drive mechanism for the piece feeding mechanism when the feed plate is attached directly to the stuffing machine;

Fig. 16 is a view similar to Fig. 15 but taken from the opposite sides;

Figs. 17, 18, 19 and 20 are diagrammatic operational views showing various positions of mechanism such as when a folded piece passes from the folding machine to the stuffing machine as in Fig. 17, then moves to a pick-up position as in Fig. 18, and continues to an envelope stuffing position as in Fig. 19, and further continues to an envelope ejecting and end of the cycle position as in Fig. 20; and Fig. 21 is a wiring diagram of the electrical control means associated with the stuffing machine and feeding device.

Figure 1:
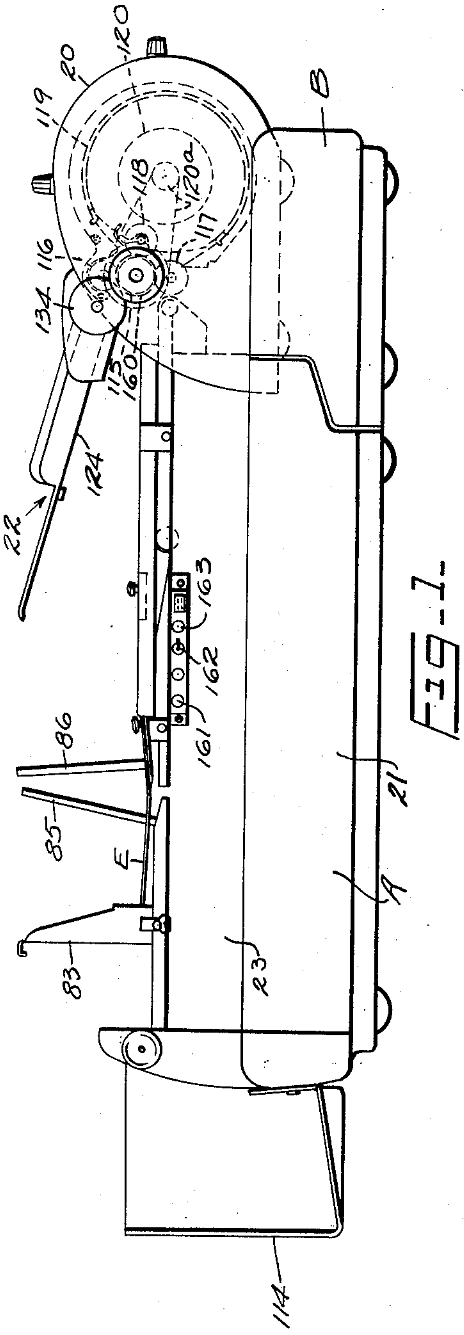
Fig. 1 is a side elevational view of the envelope stuffing machine combined with a folding machine.
Figures 3, 4:
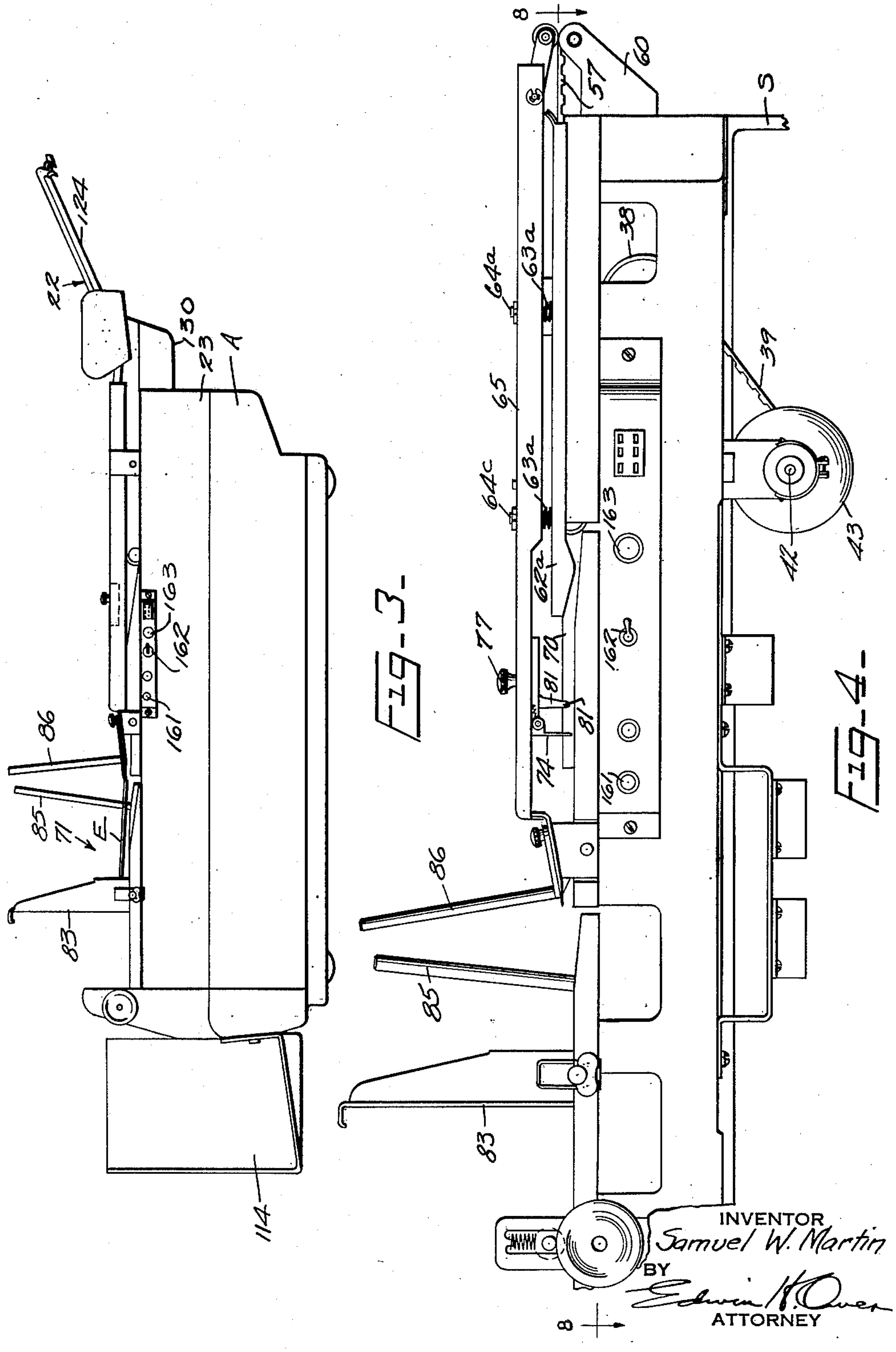
Fig. 3 is a side elevational view of the stuffing machine with a piece feed plate attached directly thereto.
Fig. 4 is an enlarged side elevation of a portion of the envelope stuffing machine.

Referring to the drawings, the device as shown in its presently preferred embodiment includes a combined folding machine 20 and envelope stuffing machine 21 as shown in Fig. 1, and further provides for the substitution of the folding machine by a sheet or piece feeding unit 22, as shown in Fig. 3. In other words, the stuffing machine 21 is adapted to be used with either of the units 20 or 22 to perform a combined folding and inserting operation or a combined piece feeding and inserting operation.

The following description will be restricted to the stuffing machine without reference to the folding or feeding units. Referring to Figs. 5, 6 and 8, the mechanism is supported on a substantial base 23, having end walls **23*a*, 23*b*, side walls 23*c*, 23*d* and inner longitudinal walls 23*e*, 23*f* and 23*g***. A sub-base A is also provided as shown in Figs. 1 and 3.

The mechanism includes a reciprocating element or ram plate 25 which has one end secured to blocks 26—26, each block being freely supported on horizontally disposed rods 27—27 running longitudinally of the machine and supported in the end walls of the main base, as best indicated at 28, Fig. 8. One of said blocks 26 extends downwardly and has a vertically disposed slot 29 therein which is engaged by a pin 31, the pin being secured to a ram drive belt 32. See also Figs. 9 and 12. The belt 32 is one of the known forms of timing belt having teeth formed on its inner surface which mesh with toothed pulleys 33 and 34 to thus provide a positive timed drive. The pulley 33 is fixed to a shaft 35 supported within the walls **23*c* and 23*e* of the main base 23. The pulley 34 is mounted on a shaft 36, supported by the wall 23*c* and a bracket 30 (Fig. 9) of the machine base 23 and is adapted to be driven through a friction disc drive unit 37. The drive includes a toothed pulley 38 driven by means of a belt 39 from a pulley 41, which pulley is directly mounted at the end of a motor shaft 42 projecting from a motor 43, Fig. 5. At each side of the pulley 38 are friction discs 50 which are compressed against the faces of the pulley as the result of pressure exerted by a spring 50*a* between a collar 50*b* fixed to the shaft 36 and a disc 50*c* engaging one of the friction discs 50. A collar 50*d* pinned to the shaft 36 bears against the other friction disc 50**.

As best shown in Figs. 9 and 12, a clutch 14 is provided on the shaft 36, the same being a spring type of clutch with a coil spring 45 wrapped around the reduced end of a hub 46, projecting from the driven pulley 34, also around the reduced end of a collar 47 which is pinned to the shaft 36. A sleeve 48 positioned over the coil spring 45 has a projecting nose portion 49 which is normally urged downwardly by one end of the spring engaged within a slot 51 in said sleeve. The opposite end of the spring 45 is anchored to the pulley hub 46 as at 52. The nose portion 49 normally engages with one end of a plunger 53 which extends from a solenoid 54. See Fig. 17. The end of the plunger 53 is slidably supported within a bracket 55 carried by the base 23 and is urged outwardly by a spring 56 to bring the end thereof into the path of the nose 49 thus forming a stop therefor. Release of the grip of the clutch spring 45 is effected upon engagement of the nose with the end of the plunger 53. Energization of the solenoid 54 will withdraw the plunger 53 from engagement with the nose 49 to permit the clutch spring to contract and effect clutching engagement with the hub 46 and collar 47 thus effecting driving engagement of the pulley 34 with the motor driven shaft 36.

The ram 25 moves forwardly as a result of the rotation of said pulley 34 and the connection of the pin 31 on the belt 32 with the slot 29 in one of the ram supporting blocks 26, which movement will continue in one direction througout the length of the belt 32. The ram will reverse its movement as the pin 31 moves around the pulley 33 to the underside thereof, and will then continue movement in a rearward direction until it reaches the home position, designated in Fig. 6. Proper electrical controls, which will be later described, continue the energization of the solenoid 54 until the ram returns just short of the home position.

Toothed belts 57 and **57*a* at each side of the ram 25 in home position engage pulleys 58–59 and 58*a*–59*a*. The belt 57 is driven by a pulley 61 on shaft 36, and through a cross-over drive shaft 60 on which the pulleys 59, 59*a*, are fixed, the belt 57*a* is also driven. Belt 57*a* further engages an idler pulley 61*a* on a stub shaft 36*a*. The shaft 60 is supported on a bracket 60*a* on the end wall 23*a***, Fig. 8.

The belts 57, **57*a* provide for the conveyance of a folded sheet or flat piece along their upper horizontal surfaces from either the folding machine 20, Fig. 1, or the feeding unit 22, Fig. 3, respectively, and along a plane slightly above the surface of the ram 25. Further, the said folded sheets and flat pieces are adapted to be conveyed to a position beyond the leading end of the ram. Assisting in the conveyance of the folded sheet or flat piece along the surface of the belts 57—57*a* are two skis 62—62*a* which are positioned directly over the horizontal surfaces of the belts 57—57*a* and are urged into engagement therewith by springs 63—63 and 63*a*—63*a*. The springs are mounted on vertically disposed pins 64—64, and 64*a*—64*a* respectively, which pins are anchored within the skis and extend upwardly through openings in a cover plate 65 in such manner that when a piece passes along the belts and beneath the skis, the skis will yield accordingly and apply sufficient pressure to effect feeding. The cover plate is secured to the base 23 and thus forms a suitable support for the spring mountings. The upper projecting ends of the pins 64 and 64*a*** have suitable spring clips or the like secured thereto.

Also associated with the belts **57—57*a* are two idler rollers 66—66*a* which are carried by arms 67—67*a*, said arms being yieldably supported on the cover plate 65 and urged in the direction of the belt surface. The leading end of each piece of folded or flat material will be engaged between the roller and belt surfaces thence carried forward by the moving belts 57—57*a* and deposited in a ram pickup position generally indicated at the location 68 in front of the leading end of the ram 25**.

Figure 7:
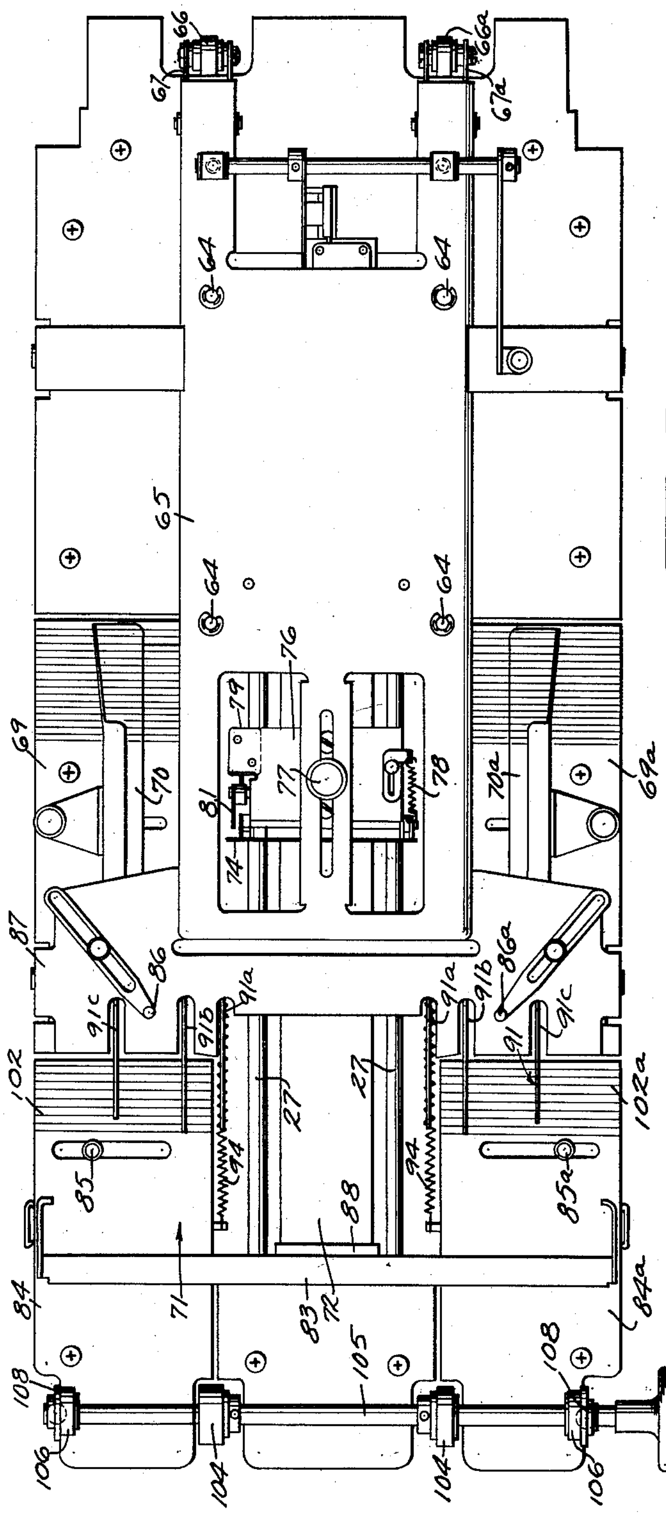
Fig. 7 is a plan view of the envelope stuffing machine.

Two supporting deck plates **69—69*a*, Fig. 7, are arranged at each side of the ram path and extend from the starting position of the leading end of the ram 25 to a position beneath the location of an envelope supply station indicated generally at 71. Said supporting deck plates 69—69*a* have a portion which dips downward beneath the discharge ends of the skis 62—62*a*. Side guides 70—70*a* are adjustably mounted on the deck plates 69—69*a*** as best shown in Fig. 7 to assist in controlling the position of the material from the ram pickup position to the envelope.

Upon leaving the belts **57—57*a* the leading end of the conveyed piece will engage a gate 74 positioned in the path thereof, which gate acts as a stop to limit the movement of the conveyed piece. The gate 74 is pivotally mounted on a shaft 75 carried by the support 76, the latter being adjustably mounted upon a portion of the cover plate 65 and being secured in an adjusted position by means of a thumb screw 77. By means of a spring 78, the gate 74** is urged to the stop position shown in Fig. 6.

A ram starting switch 79 is also supported by the support 76 and includes a finger 81 pivotally mounted thereon which is adapted to be engaged by the leading end of the conveyed piece just prior to the engagement of said end with the gate 74. When the finger 81 is so engaged, it will be rocked to cause a cam portion 82 thereon to effect closing of the switch 79 for the purpose of energizing the solenoid 54 and thus effect the operation of the ram 25 through its reciprocating cycle. See Fig. 17.

The conveyed piece P, which at the time of energization of the solenoid 54 is lying across the supporting deck members **69—69*a*, and a central guide or track member 72, will have its trailing edge engaged by projections 80*a*—80*a* extending downwardly from a transverse bar 80 secured to the under surface of the ram 25**, as best seen in Fig. 9*a*. The guide track 72 extends the length of the machine. The bar 80 has upwardly projecting lugs **80*c*—80*c* engaging slots 80*d*—80*d* in the ram plate 25 adapted to be adjusted therealong to a position which will cause the insert piece to be pushed entirely into the open mouth of an envelope. The bar 80 is secured by means of a screw 80*b* which passes through a slot 80*c* in the ram 25**.

The envelope supply station 71 includes a supporting vertically disposed end plate 83 adjustably positioned on two envelope guide and supporting deck plates **84—84*a* which plates are positioned at each side of the ram path and are secured to the machine base 23. Also supported on the envelope deck plates 84—84*a* are two upwardly projecting guide rods 85—85*a* arranged for horizontal adjustment in a transverse direction across the surfaces of the guide plates 84—84*a*. Said guide rods 85—85*a* are provided for the purpose of guiding the side edges of the envelopes. Further guide rods 86—86*a* are provided for guiding the open flap edges of the envelopes and are adjustably positioned on a plate 87 secured to the cover plate 65**.

Envelopes E are stacked with their flaps open and with their side edges freely positioned between the guide rods **85—85*a* and the flap edges engaging the guide rods 86—86*a*. The closed edge of the lowermost envelope rests upon a lip 88 projecting from the inner surface of the envelope end plate 83**.

Directly beneath the flap of the lowermost envelope are a group of claws generally indicated at 91, Fig. 11, which are arranged to move into the mouth of the envelope to open same prior to the feeding of a folded or flat piece therein by means of the ram 25. Said claws are arranged in groups of three on each side of the ram path as best shown in Figs. 7 and 8, and are designated as 91a—91a for the innermost claws, 91b—91b for the intermediate claws and 91c—91c for the outermost claws of each group. The claws are arranged in a manner best seen in Figs. 6, 10 and 11, and each claw includes a claw extension tie bar 92. Each of the extension tie bars of the claws 91b and 91c is connected to the free end of a lever 93 and the free end of a lever 95. It will be noted that the connection with the lever 95 is at a shorter radius than with the lever 93. This provides for a retarded motion of the claws upon entering the envelope mouth. Two levers 95a—95a associated with the claws 91a—91a have extensions 95b—95b which have connected thereto one end of each of two tie rods 99—99, the opposite ends of said rods being looped around the ram guide rods 27, as indicated at 99a—99a. See Figs. 6 and 8. The looped ends 99a—99a of the rods 99—99 are positioned between shock absorbing springs 101—101 and portions of the ram supporting blocks 26—26. As seen in Fig. 8, the innermost and next adjacent levers 93—93 and 95—95 respectively are arranged at each side of the ram path, and are normally urged by springs 94 to rock from the broken line to the full line positions of Fig. 11.

In Fig. 10 it will be seen that the levers 93 and 95 which are connected to the inner and outer claws 91a—91a and 91c—91c, are pinned to shafts 96 and 97 respectively, which shafts are freely mounted in bearings supported by walls 23c and 23e and in walls 23f and 23d respectively of the machine base 23. Hence when the inner claw and lever assemblies are spring urged into the envelope mouth, the outer claw assemblies move simultaneously therewith. The levers 93—95 connected with the intermediate claws 91b—91b are not fixed to the shafts 96 and 97, hence the claws move freely under control of their associated springs 94.

In Fig. 10 the claws 91 are shown in their advanced positions within the envelope mouth. It will be noted that the intermediate claws 91b—91b extend further than the claws 91a—91a and that the claws 91a—91a extend further than the claws 91c—91c. These claw positions also indicate the timing of the claws, that is, the claws 91b—91b enter first, then the claws 91a—91a and finally the claws 91c—91c. Clamping engagement of the intermediate claws 91b—91b with the inner surface of the envelope is provided whereas the outer claws 91c—91c are arranged to engage the envelope wall in a non-clamping position. The innermost claws 91a—91a are located over the space between the deck plates 84—84a, as in Fig. 7, and effect depression of the envelope wall therein.

Stop plates 100—100 are adjustably mounted on base walls 23e—23f, and have lugs 100a—100a and 100b—100b extending therefrom, said lugs extending into the paths of the levers 95 associated with the inner and intermediate claws 91a—91a and 91b—91b. Adjustment is made to place the stop plates in positions which will cause the lugs 100a—100a to maintain the intermediate claws in a predetermined gripping position relative to the envelope and deck.

It is of particular importance to note that the intermediate claws are yieldably connected to the levers 93 by means of springs 90, the lower end of each spring being anchored to a stud 90a projecting from its associated lever and the other end of the spring being secured to a pin 90b projecting from the claw and also projecting through a slot 90c in the lever. This arrangement allows the intermediate claws to yield when the ram 25 engages the innermost or bottom end of the envelope during each stuffing operation. Otherwise the intermediate claws would tend to increase their grip on the envelope and prevent envelope removal by the ram to an ejecting position. Retraction of the claws 91a—91a is effected by the direct connection of the rods 99—99 with the extensions 95b—95b of the levers 95a—95a as the ram 25 approaches its home position. Claws 91c—91c, which as previously stated are pinned to the shafts 97—97 will be retracted simultaneously with the claws 91a—91a. The intermediate claws 91b—91b are retracted by means of pins 96a—96a which extend from shafts 96—96, as best seen in Figs. 10 and 11. Said pins 96a—96a are arranged to engage the studs 90a—90a to which the springs 90—90 are anchored and thereby retract the levers 93—93 and attached claws 91b—91b.

As soon as the ram starts to move from its home position, the claws 91 move toward and enter the mouth of the lowermost envelope to open same and provide sufficient opening for the passage of the ram and insert therein. Upon engagement of the ram with the inner surface of the lower portion of the lowermost envelope, the supported end of the envelope will be withdrawn downwardly from the lip 88 and the envelope with its insert will be advanced by the ram until the leading end of the envelope engages with a pair of driven ejector rollers 104—104 and 104a—104a.

The upper rollers 104—104 are mounted on a shaft 105 which shaft is normally supported within bearing blocks 106—106. The blocks are carried by end supports 108—108 and are urged downwardly by springs 107—107. The rollers 104a—104a are mounted on a shaft 109, which shaft is supported within end bearings 110—110 provided in the walls 23c—23d of the base of the machine. Said shaft is adapted to be driven by means of a drive belt 111 which engages a pulley 112 fixed to the shaft 109 and a pulley 113 respectively. The pulley 113 is fixed to shaft 35 which is driven by the pulley 33 associated with the ram drive belt 32. The lowermost rollers 104a—104a are thus driven and when the stuffed envelope is engaged between said rollers and the upper rollers 104—104, it is withdrawn from the ram and ejected into a hopper 114.

Figure 2:
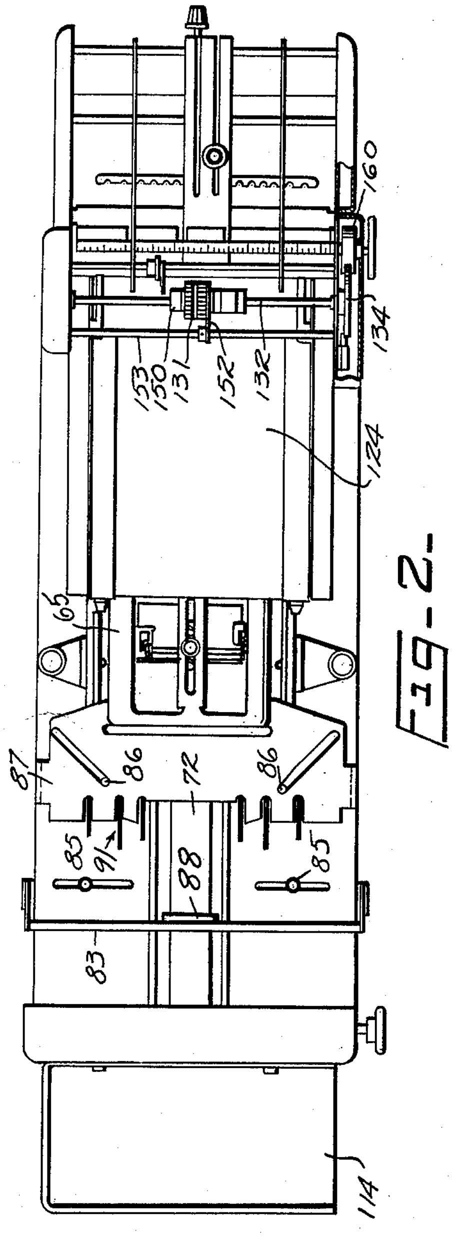
Fig. 2 is a plan view of Fig. 1.

Referring now to the combined folding and stuffing machine, as found in Figs. 1 and 2, the folding machine indicated at 20 is of the buckle chute type, as for example, the type disclosed in U.S. Letters Patent No. 2,751,221. Said machine generally includes a plurality of folding rollers in the order of a central roller 115, an upper roller 116, a lower roller 117, and a side roller 118. The central roller 115 is driven by a motor operated pulley and belt drive 120a, the motor 120 being located within the folding machine. The other rollers 116, 117 and 118 are frictionally engaged with the roller 115. A buckle chute is provided as indicated at 119. A sub-base B is also provided to support the folding machine at the proper elevation relative to the stuffing machine.

A sheet or piece feeding device generally indicated at 22 of Fig. 1 is detachably mounted on the folding machine and is adapted for attachment directly to the stuffing machine in the manner illustrated in Fig. 3. In the following description the feeding device 22 will be considered in detail and in its relation to the stuffing machine. Said device includes a feed plate 124 which is removably mounted at one end of the base of the stuffing machine. See Figs. 15 and 16. A two point mounting is provided which includes notches 125—125 in side walls 126—126 of the feed plate which engage studs 127—127 projecting from the walls of a bracket 130 detachably supported on the machine base, also notched lugs 128—128 positioned at the underside of the feed plate and engaging studs 129—129 which also project from the walls of the bracket 130.

Said feeding device further includes a sheet feed roller generally indicated at 131, Fig. 14, which is carried on a shaft 132 driven through gearing generally indicated at 133 by means of the frictional contact of a friction drive wheel 134 with a friction wheel 135 carried by a shaft 136. The shaft 132 is supported by end plates 137—137 secured to the feed plate 124. The friction wheel 135 and shaft 136 are supported by the bracket 130 and have a flexible shaft 138 connecting the shaft 136 with the driven shaft 60. See Fig. 8.

A separator element 141 cooperates with the feed roller 131 and comprises a frictional surfaced roller 142 supported in an adjustable mounting 143 which is adapted to provide an eccentric adjustment for the roller 142 and is manipulated by means of a control knob and screw connection 144—144a respectively. Adjustment of said knob 144 will effect separation between the surface of the feed roller 131 and separator roller 142, said adjustment being the means for restricting the passage of more than a single sheet during each feeding operation. See Figs. 15 and 16.

The sheet feed roller 131 may be provided with two frictional drive portions 145, 145 which preferably comprise corrugated rubber bands mounted within recesses in the roller portion 131, as best seen in Fig. 14. The roller 131 is freely mounted on the shaft 132 and is adapted to be driven through a slip clutch which frictionally engages with one face of the feed wheel 131. The clutch includes a ratchet wheel 146 freely supported on the shaft 132 and having friction discs 147—147 positioned at each side. By means of a spring 148 compressed between an axially movable collar 149 and a collar 151 fixed to the shaft 132, the collar 149 effects a driving pressure through the friction discs 147—147 to rotate both the ratchet wheel 146 and feed roller 131. A pin 149a also provides a driving connection between the collars. A thrust bearing 150 and collar 150a pinned to the shaft 132, provide substantial thrust means for the opposite side of the roller 131.

The rotation of the ratchet wheel is adapted to be stopped when engaged by a pawl 152. The friction disc 147 between the driven collar 149 and ratchet wheel 146 will thus slip and the feed roller 131 will discontinue rotation.

The pawl 152 is fixed on a shaft 153 which shaft is supported by the end plates 137—137. A lever 154 is also fixed to the shaft 153 and has its free end connected with a plunger 155 extending from a solenoid 156. A spring 157 connected to the lever 154 normally urges the lever in a clockwise direction when looking at Fig. 16. This causes the pawl 152 to be normally retained in a non-engaging position with the ratchet. As will be later explained, the feed of each sheet is effected when the solenoid 156 is de-energized.

When it is desired to provide for the folding of sheets before advancing same to the stuffing machine, the folder 20 is placed in an operative relation with the stuffing machine in the manner shown in Figs. 1 and 2. The sheet feeding unit 22 will now be mounted directly on the folding machine in the manner indicated. With the sheet feed unit in the latter position, the notches 125 in walls 126 of the feed plate 124 and the notched lugs 128 engage with studs 158 and 159 respectively, which studs project from the side walls of the folding machine. See Fig. 13. The drive of the friction wheel 134 is effected in a manner similar to that previously described where the feed plate was mounted on the stuffing machine base, except that a roller 160 is substituted for the roller 135 and is carried by a shaft which supports the driven folding roller 115.

Referring now to the electrically controlled devices and particularly to Figs. 17 through 21, a plurality of switches and relays are arranged in an order to be operated either manually or automatically during various operations of the machine to effect control of the feed stop solenoid 156 or ram release solenoid 54. Three manual switches, a power switch 161, a motor switch 162, and a sheet or piece feed control switch 163, are mounted on the side of the machine as indicated in Fig. 4, at a convenient location for operator manipulation. Switch 79, previously described, is operated by the cam 82 when the finger 81 is engaged by the leading end of the folded sheet or piece before it engages the gate 74. A switch 165 is positioned in the path of and actuated by a cam 166, said cam being supported on a shaft 97 which is associated with the claw actuating elements. Two switches 167, 168, are arranged one above the other in the path of the ram block 26 as indicated in Fig. 8 and are in parallel. Each switch is provided with a one way actuating switch arm which is actuated when engaged by the ram block. The switch 167 is actuated when the ram moves in a forward direction, and the switch 168 is actuated when the ram returns. The switch 167 is associated with the sheet feed unit 22 when attached to the folding machine and the switch 168 is associated with the sheet feed unit 22 when it is attached directly to the stuffing machine. Either of said switches is normally connected to the circuit through two separate plug-in connections which fit only their associated units. The open switches 167a and 168a represent the plug-in connections. Another switch 169, similar to switches 167—168, is positioned in the path of the ram block 26 for engagement thereby after the ram block passes the switches 167 and 168. A switch 173 is associated with the sheet or piece feeding unit 22 and has a switch arm 174 extended into the path of the leading end of the piece which is being fed by the roller 131. At the discharge position two switches 175 and 176 are located at either side of the ejector rollers 104—104a. Further, a relay 177 is associated with the piece feed control solenoid 156 and a second relay 178 is associated with switch 79.

The circuit wiring will now be described in conjunction with the operation of the machine. From one side of the power line 180, the power switch 161 and motor switch 162 connect the motor 43 in series with the other side of the power line 181. When both switches 161 and 162 are closed, the motor will effect the drive of belts 57, 57a and the roller 135 or 160. A sheet or piece will advance between the feed roller 131 and separator member 142 until the leading end engages switch arm 174 to close switch 173 which completes a circuit from power line 180 through a line 183, normally closed relay contacts 177a and solenoid 156 to the power line 181. The solenoid being energized will cause the pawl 152 to engage ratchet wheel 146 causing the clutch to slip and thereby temporarily stop the further feed of the sheet.

For an initial sheet or piece feeding operation of the machine, the switch 163 is closed to complete a circuit from power line 180 through line 184 to the relay magnet 177 and back to power line 181. The closed contacts 177a are thus opened to de-energize the solenoid and allow the pawl 152 to be spring withdrawn and thus permit the frictional drive of the sheet feed roller 131 by the friction discs 147, 147 as previously described.

The switch 163 is immediately permitted to open but the relay 177 will remain energized because there is a closed circuit from power line 180 through closed switches 161 and 173, line 183, closed contacts 177b, relay 177 and line 181. When the sheet or piece advances beyond the switch arm 174 the switch arm will be urged to an open position to break the circuit to the relay 177, allowing the contact 177a to be closed. Switch 173 being open will permit the feed roller 131 to continue its rotation until the next sheet or piece engages the switch arm 174 to again close the switch 173 and complete a circuit to energize the solenoid 156 and discontinue the further feed of the second sheet.

In the meantime the first sheet or piece advances through a folding operation and to the rollers 66—66a and belts 57—57a, if it is a sheet to be folded or otherwise advances directly to said rollers 66—66a and belts 57—57a to be conveyed to the ram pick-up position 68.

Before reaching said ram pick-up position, the switch finger 81 is engaged by the conveyed piece to effect closing of the switch 79. Said switch 79 is connected with the solenoid 54 through line 185 and through line 187 to the power line 181, while line 186 connects the other side of the switch 79 through normally closed relay contacts 178a and line 186a to the power line 180.

With the solenoid 54 energized the ram movement begins and the claws 91 are released for movement into the mouth of the envelope. Rocking movement of the shaft 97 causes cam 166 to be rocked to close switch 165 which switch is connected to the power line 180 through line 188. The other side of switch 165 is connected to the solenoid 54 through line 185 and thus maintains a closed circuit to the power line 181 after the ram moves past the switch arm 81 and causes the switch 79 to open.

The ram movement causes the ram block portions 26 to engage the switch arms of the switches 167 and 168 and whichever one is connected in the circuit through its respective switch 167a or 168a, that switch will be closed to energize the relay 177, thus again breaking the contact 177a and de-energizing the solenoid 156. The pawl 152 is thus withdrawn and sheet feed will be effected to the folding machine during the forward stroke of the ram upon engaging switch 167, or sheet feed from the feed plate will be effected to the stuffing machine when the switch 168 is engaged on the back stroke of the ram. Both switches 167 and 168 are in parallel with manual switch 163 to thus automatically effect the starting of a sheet feed. If some mis-operation should cause the machine to stop, the manual switch 163 is available to start a feeding operation.

Further movement of the ram will cause the ram-block to next engage a switch closing arm 169a of switch 169 which will effect energizing of the relay 178 to break the contacts 178a thus breaking the circuit to the switch 79. One side of the switch 169 is connectted to line 182, thence to the power line 180 while the other side of the switch is connected through line 189 to normally closed switch 176. From switch 176 the line continues as 191 through the relay 178 to the power line 181. Although the switch 169 will open after the ram passes the arm 169a, the relay will remain energized due to the rocking of the contact arm from the contact 178a to contact 178b which completes the circuit from the power line 180 through lines 182 and 186a back through the closed switch 176 and line 191 to the relay 178 and power line 181. The fact that switch 79 is now cut out of the circuit, recycling of the machine cannot occur until the circuit to relay 178 is broken. Therefore, although the feed of a subsequent folded or other sheet to the ram pick-up position is in progress, the machine will not be recycled when the sheet strikes the finger 81 until the stuffed envelope of the preceding operation has been properly ejected from the machine.

After the ram enters the open mouth of the envelope to move the folded or other piece therein, the envelope is stripped from the stack and during advancement the envelope engages a switch arm 175a prior to being withdrawn by the ejection rollers 104, 104a. The switch 175 will be closed and complete a circuit through line 191 to the relay 178. While this repeats the same function as previously accomplished by the closing of switch 169, it is provided for the purpose of detecting a jam condition if such condition occurs while the stuffed envelope is passing through the ejection rollers 104, 104a and is thus in engagement with both switch arms 175a and 176a as in Fig. 19. Here the normally closed switch 176 would be open and the circuit to the relay 178 broken. However, the switch 175 is now closed and the closed circuit to the relay 178 will be maintained from power line 180, line 182, switch 175, line 191, relay 178 to power line 181. Therefore, although the stuffed envelope almost reached the final ejection position before a jam occurred, the machine will not be recycled until the envelope is finally ejected.

After the trailing end of the stuffed envelope passes the switch arm 175a the switch 175 opens, and inasmuch as the switch 176 is also open at that moment, the circuit to the relay 178 is broken. This allows the contact arm to return to contact 178a to thus prepare the circuit for a recycling operation. The return of the ram

25 to its home position will open the circuit controlled by switch 165 when the ram blocks 26 engage the loops 99a of the rods 99 which rock levers 95a, shaft 97 and switch actuating cam 166 to thus break the circuit to the solenoid 54.

During the reciprocating cycle of the ram 25, when either of the switches 167a, 168a was closed, the relay 177 would be energized to break the contact 177a and thus de-energize the solenoid 156. This would permit the feed of the next sheet which would be in a pick-up position by the time the ram 25 reached home thus causing the closing of the switch 79 and the re-energization of the solenoid 54 to permit the continuation of the drive of the ram 25 through another cycle.

What is claimed is:

1 In a machine for stuffing folded or non-folded sheets into envelopes wherein the sheets are conveyed from an input location at one end of the stuffing machine into an open mouthed envelope and the stuffed envelope is discharged from the opposite end of the machine; the combination therewith of a sheet folding unit operatively and detachably positioned at the input location of said machine, a sheet feed unit detachably attached to either the folding unit or directly to the stuffing machine, said feed unit including a clutch controlled sheet feed wheel and a separator member, continuously driven means mounted within the stuffing machine, continuously driven means mounted within the folding unit, and means connected to the clutch controlled feed wheel and engageable with one of the two last-named driven means to be driven thereby when the feed unit is attached to either the stuffing machine or folding unit respectively.

2. In a machine for stuffing folded or non-folded sheets into envelopes wherein the sheets are conveyed from an input location at one end of the stuffing machine into an open mouthed envelope and the stuffed envelope is discharged from the opposite end of the machine; the combination therewith of a sheet folding unit operatively and detachably positioned at the input location of said machine, a sheet feed unit detachably attached to either the folding unit or directly to the stuffing machine, said feed unit including a sheet feed wheel and a separator member, a continuously driven roller mounted within the stuffing machine, a continuously driven roller mounted within the folding unit, and a friction drive wheel connected to the clutch controlled feed wheel and engageable with one of the last-named rollers to be driven thereby when the feed unit is attached to either the stuffing machine or folding unit respectively.

3. In a machine for stuffing folded or non-folded sheets into envelopes wherein the sheets are conveyed from an input location at one end of the stuffing machin into an open mouthed envelope and the stuffed envelope is discharged from the opposite end of the machine; the combination therewith of a sheet folding unit operatively and detachably positioned at the input location of said machine, a sheet feed unit detachably attached to either the folding unit or directly to the stuffing machine, said feed unit including a clutch controlled sheet feed wheel and a separator member, continuously driven means mounted within the stuffing machine, continuously driven means mounted within the folding unit, means connected to the clutch controlled feed wheel and engageable with one of the two last-named driven means to be driven thereby when the feed unit is attached to either the stuffing machine or folding unit respectively, electrically controlled means to effect clutch engagement and the consequent feed of a sheet, a first contact closing switch to effect closing of a circuit to the electrically controlled means when the sheet feed unit is positioned on the folding machine, and a second contact closing switch to effect closing of a circuit to the electrically controlled means when the sheet feed unit is positioned on the stuffing machine.

4. In a machine for stuffing folded or non-folded sheets into envelopes wherein the sheets are conveyed from an input location at one end of the stuffing machine into an open mouthed envelope and the stuffed envelope is discharged from the opposite end of the machine; the combination therewith of a sheet folding unit operatively and detachably positioned at the input location of said machine, a sheet feed unit detachably attached to either the folding unit or directly to the stuffing machine, said feed unit including a clutch controlled sheet feed wheel and a separator member, continuously driven means mounted within the stuffing machine, continuously driven means mounted within the folding unit, means connected to the clutch controlled feed wheel and engageable with one of the two last-named driven means to be driven thereby when the feed unit is attached to either the stuffing machine or folding unit respectively, solenoid controlled means including a relay to maintain clutch engagement and the consequent feed of a sheet while the solenoid is energized, a first contact closing switch to effect closing of a circuit to the relay when the sheet feed unit is positioned on the folding machine, and a second contact closing switch to effect closing of a circuit to the relay when the sheet feed unit is positioned on the stuffing machine.

5. In a machine for stuffing folded or non-folded sheets into envelopes wherein the sheets are advanced by means of a reciprocating ram from a pick-up location at one end of the stuffing machine into an open mouthed envelope and the stuffed envelope is discharged from the opposite end of the machine; the combination therewith of a sheet folding unit operatively and detachably positioned at the input location of said machine, a sheet feed unit detachably attached to either the folding unit or directly to the stuffing machine, said feed unit including a clutch controlled sheet feed wheel and a separator member, continuously driven means mounted within the stuffing machine, continuously driven means mounted within the folding unit, means connected to the clutch controlled feed wheel and engageable with one of the two last-named driven means to be driven thereby when the feed unit is attached to either the stuffing machine or folding unit respectively, electrically controlled means to effect clutch engagement and the consequent feed of a sheet, a first contact closing switch to effect closing of a circuit to the electrically controlled means when the sheet feed unit is positioned on the folding machine, a second contact closing switch to effect closing of a circuit to the electrically controlled means when the sheet feed unit is positioned on the stuffing machine, and means movable by the reciprocating ram to operate the first contact closing switch during ram movement in one direction and to operate the second contact closing switch during ram movement in the opposite direction.

6. In an envelope stuffing machine, a reciprocating element having a home position at one end of the machine, means to support an envelope at the opposite end of the machine with the mouth open in the path of the reciprocating element, means to convey a folded or non-folded sheet to a pick-up position relative to the reciprocating element before the latter advances from said home position, a clutch controlled drive for said reciprocating element including a clutch stop to effect disengagement of the clutch and stopping of the reciprocating element in its home position, an electrical contact closing switch operable by a sheet when conveyed to the pick-up position, electromagnetic means energized by said switch to effect withdrawal of the clutch stop and consequent engagement of the clutch whereby a cycle of operation of the reciprocating element is effected, and means to maintain energization of the electromagnetic means until the reciprocating element approaches its home position.

7. In an envelope stuffing machine, a reciprocating element having a home position at one end of the machine, means to support an envelope at the opposite end of the machine with the mouth open in the path of the reciprocating element, means to convey a sheet to a pick-up position relative to the reciprocating element before the latter advances from said home position, a clutch controlled drive for said reciprocating element including a clutch stop to effect disengagement of the clutch and stopping of the reciprocating element in its home position, an electrical contact closing switch operable by a sheet when conveyed to the pick-up position, electromagnetic means energized by said switch to effect withdrawal of the clutch stop and consequent engagement of the clutch whereby a cycle of operation of the reciprocating element is effected, and switch closing means operable at the beginning of the movement of the reciprocating element to maintain a closed electrical circuit to the electromagnetic means until the reciprocating element has returned to its home position.

8. In an envelope stuffing machine, the combination comprising: a machine base, a ram, means for cyclically reciprocating said ram relative to said base between a home position and an envelope stuffing position, means to support an envelope with its mouth open in the path of the reciprocating element, manually controlled means to feed a first sheet from a stack when initially starting the machine operation, means to convey said sheet to a location in the path of the ram for movement by the ram into the envelope, a clutch controlled drive for said reciprocating means, a first electrical contact closing switch operable by the sheet during conveyance to the ram location to effect clutch engagement and consequent operation of the reciprocating means, a second electrical contact closing switch responsive to said starting movement of the reciprocating means to maintain the clutch engagement until the reciprocating element has returned to its home position, and means operable in response to the movement of the ram to effect the feeding of another sheet by the sheet feeding means thereby preparing the machine for a second and uninterrupted cycle of operation before the ram reaches home.

9. In an envelope stuffing machine, the combination comprising: a machine base, a ram, means for cyclically reciprocating said ram relative to said base between a home positon and an envelope stuffing position, means to support an envelope with its mouth open in the path of the reciprocating element, manually controlled means to feed a first sheet from a stack when initially starting the machine operation, means to convey said sheet to a location in the path of the ram for movement by the ram into the envelope, a clutch controlled drive including a solenoid operated clutch trip therefor, a first electrical contact closing switch operable by the sheet during conveyance to the ram location to energize the solenoid and effect operation of the reciprocating means, a second electrical contact closing switch responsive to said starting movement of the reciprocating means to maintain the clutch engagement until the reciprocating element has returned to its home positon, and means operable in response to the movement of the ram to effect the feeding of another sheet by the sheet feeding means thereby preparing the machine for a second and uninterrupted cycle of operation before the ram reaches home.

10. In an envelope stuffing machine, the combination comprising: a machine base, a ram, means for cyclically reciprocating said ram relative to said base between a home position and an envelope stuffing position, means to support an envelope with its mouth open in the path of the reciprocating element, a manual push button operated electrical contact closing switch to close an electrical circuit controlled means to feed a first sheet from a stack when initially starting the machine operation, means to convey said sheet to a location in the path of the ram for movement by the ram into the envelope, a clutch controlled drive for said reciprocating means, a first electrical contact closing switch operable by the sheet during conveyance to the ram location to effect clutch engagement and consequent operation of the reciprocating means, a second electrical contact closing switch responsive to said starting movement of the reciprocating means to maintain the clutch engagement until the reciprocating element has returned to its home position, and means operable in response to the movement of the ram to effect the feeding of another sheet by the sheet feeding means thereby preparing the machine for a second and uninterrupted cycle of operation before the ram reaches home.

11. In an envelope stuffing machine, the combination comprising: a machine base, a ram, means for cyclically reciprocating said ram relative to said base between a home position and an envelope stuffing position, means to support an envelope with its mouth open in the path of the reciprocating element, manually controlled means to feed a first sheet from a stack when initially starting the machine operation, means to convey said sheet to a location in the path of the ram for movement by the ram into the envelope, a clutch controlled drive for said reciprocating means, a first electrical contact closing switch operable by the sheet during conveyance to the the ram location to effect clutch engagement and consequent operation of the reciprocating means, a second electrical contact closing switch responsive to said starting movement of the reciprocating means to maintain the clutch engagement until the reciprocating element has returned to its home position, means operable in response to the movement of the ram to effect the feeding of a second sheet by the sheet feeding means thereby preparing the machine for a second and uninterrupted cycle of operation before the ram reaches home, and switch operated means operable in response to further movement of the ram including a relay energized thereby to break a circuit to the first electrical contact closing switch, whereby recycling of the machine by the engagement of the second sheet with the first electrical contact closing switch is prevented until the machine is ready for a succeeding envelope stuffing operation.

12. In an envelope stuffing machine, the combination comprising: a machine base, a ram, means for cyclically reciprocating said ram relative to said base between a home position and an envelope stuffing position, means to support an envelope with its mouth open in the path of the reciprocating element, manually controlled means to feed a first sheet from a stack when initially starting the machine operation, means to convey said sheet to a location in the path of the ram from movement by the ram into the envelope, a clutch controlled drive for said reciprocating means, a first electrical contact closing switch operable by the sheet during conveyance to the ram location to effect clutch engagement and consequent operation of the reciprocating means, a second electrical contact closing switch responsive to said starting movement of the reciprocating means to maintain the clutch engagement until the reciprocating element has returned to its home position, means operable in response to the movement of the ram to effect the feeding of a second sheet by the sheet feeding means thereby preparing the machine for a second and uninterrupted cycle of operation before the ram reaches home, switch operated means operable in response to further movement of the ram including a relay energized thereby to break a circuit to the first electrical contact closing switch, driven ejection rollers positioned to receive and eject a stuffed envelope, and a normally closed switch electrically connected with the relay including an actuating finger in the path of a stuffed envelope as it is driven from the ejection rollers, whereby the finger is engaged by the stuffed envelope during ejection by the ejection rollers to open the normally closed switch and circuit to the relay and close the circuit to the first electrical contact closing switch to effect recycling of the machine.

13. An envelope stuffing machine comprising a base having a reciprocating sheet advancing ram movable from a sheet receiving end to a discharge end of the machine, a hopper having open flapped envelopes stacked therein with the lowermost envelope lying in the path of the ram with the flap uppermost, means to open the mouth of the lowermost envelope before the approach of the ram and comprising a plurality of claw elements at each side of the ram each having a common pivotal axis, and means to move said claw elements about said axis and into said envelope mouth in an order which will initially effect the opening of the inner portion of the lower wall of the envelope then the outer portion thereof.

14. An envelope stuffing machine comprising a base having a reciprocating sheet advancing ram movable from a sheet receiving end to a discharge end of the machine, a hopper having open flapped envelopes stacked therein with the lowermost envelope lying in the path of the ram with the flap uppermost, a deck portion beneath the hopper, means to open the mouth of the lowermost envelope before the approach of the ram and comprising a plurality of claw elements at each side of the ram, means to move said claw elements into said envelope mouth in a successive order with the outermost claws entering last thereby causing the lower wall of an envelope to be drawn away from the upper wall thereof at a plurality of spaced locations, and stop members to limit the movement of the claw elements in their mouth opening positions relative to the deck portion.

15. An envelope stuffing machine comprising a base having a reciprocating sheet advancing ram movable from a sheet receiving end to a discharge end of the machine, a hopper having open flapped envelopes stacked therein with the lowermost envelope lying in the path of the ram with the flap uppermost, a deck surface below the lowermost envelope and at each side of the ram path, means to open the mouth of the lowermost envelope before the approach of the ram and comprising three claw elements at each side of the ram, and means to move said claw elements relative to said deck surfaces and into said envelope mouth in a successive order with the outer claws entering last.

16. In an envelope stuffing machine, a reciprocating element having a home position at one end of the machine, means to support an envelope at the opposite end of the machine with the mouth open in the path of the reciprocating element, means to convey folded or nonfolded sheets to a pick-up position relative to the reciprocating element before the latter advances from said home position, said reciprocating element including a plate, a sheet supporting track beneath the path through which the plate moves, and a pusher bar suspended from and longitudinally adjustable along said plate to provide a driving force against the trailing edge of sheets of varying width to move each sheet into the envelope mouth.

17. In an envelope stuffing machine, a reciprocating element having a home position, means to support an envelope with the mouth thereof open in the path of the reciprocating element, a pair of horizontal guide rails, means to convey flat or folded sheets to a pick-up position relative to the reciprocating element at the home position, said reciprocating element including a plate having longitudinal slots and slidably supported on said guide rails, a horizontally positioned sheet supporting track intermediate said guide rails and beneath the path of said plate, and a sheet pusher bar having lugs engaging the plate slots from a position beneath the plate, and means to secure the pusher bar to the plate at a desired position of adjustment to thereby provide means for engaging the trailing edge of sheets of varying widths and entirely move the sheets into an envelope.

References Cited in the file of this patent

UNITED STATES PATENTS

| | | |
|---|---|---|
| 2,001,009 | Baker | May 14, 1935 |
| 2,766,569 | Strother et al. | Oct. 16, 1956 |
| 2,771,726 | Owen et al. | Nov. 27, 1956 |